United States Patent Office 3,499,872
Patented Mar. 10, 1970

3,499,872
PROCESS FOR THE PRODUCTION OF POLYMERS CONTAINING POLYUREA OR POLYHYDRAZODICARBONAMIDE LINKAGES
Wilhelm Thoma, Cologne-Flittard, and Heinrich Rinke and Harald Oertel, Leverkusen, Germany, assignors to Farbenfabriken Bayer Aktiengesellschaft, Leverkusen, Germany, a corporation of Germany
No Drawing. Continuation-in-part of applications Ser. No. 341,105, and Ser. No. 341,106, Jan. 29, 1964. This application Aug. 19, 1966, Ser. No. 573,468
Int. Cl. C08f 22/02, 22/16
U.S. Cl. 260—75   11 Claims

ABSTRACT OF THE DISCLOSURE

A method is provided for making a polyurea or polyhydrazodicarbonamide suitable for films or filaments by reacting an organic diisocyanate with a compound prepared by reacting a diamine or hydrazine with carbon dioxide or sulphur dioxide in a polar solvent.

---

This application is a continuation-in-part of our applications Ser. No. 341,105 and Ser. No. 341,106 filed Jan. 29, 1964, and now abandoned.

This invention relates to substantially linear polyaddition products and to a process for producing such products. More particularly, it relates to a method of preparing polyaddition polymers by the NCO-active hydrogen atom reaction.

The reaction of diisocyanates with diamines to build up polyaddition products having the groupings

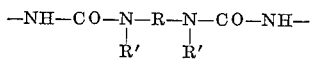

has been heretofore known. This reaction nearly always leads to insoluble or difficultly soluble polyureas which can neither be dissolved nor melted (owing to decomposition at the high melting temperatures required) to bring them into a condition suitable for technical molding processes.

It is also known that polyureas can be prepared by heat condensation in boiling benzene or chlorobenzene from diisocyanates and carbonic acid salts of diamines (German patent specification No. 838,217). Furthermore, solutions of substantially linear elastomers may be prepared by polyaddition of approximately equivalent quantities of isocyanate-modified polyhydroxyl compounds containing terminal NCO groups with diamines in polar solvents such as dimethylformamide, and these solutions can be formed into highly elastic threads, foils and coatings. (DAS No. 1,104,697, U.S. patent specification No. 2,929,804 and Belgian patent specification Nos. 574,488 and 574,384.)

It has also been heretofore known to react diisocyanates with hydrazine to form compounds of high molecular weight comprising the grouping

Similarly, polyester-diisocyanate and polyether-diisocyanate adducts and hydrazine have been reacted in the melt by the polyaddition process to form cross-linked elastomers. Furthermore, by polyaddition reaction of approximately equal quantities of hydrazine and of prepolymers obtained from polyhydroxyl compounds of higher molecular weight with excess quantities of diisocyanates, in polar solvents such as dimethylformamide solutions, it is possible to produce substantially linear elastomers which can be shaped to form highly elastic filaments, foils or coatings.

The isocyanate-modified polyhydroxyl compounds containing terminal NCO groups will hereinafter be termed NCO-pre-adducts. These NCO-pre-adducts are prepared by reacting an excess of an organic diisocyanate with a substantially linear hydroxyl terminated polymer.

The high velocity of the reaction between diisocyanates and diamines including hydrazine, particularly in solvents, is often disturbing, since secondary reactions can occur (e.g. because of insufficient mixing of the reactants), which readily lead to crosslinked polyaddition products which are gels or gel-containing solutions, which cannot be shaped to form filaments or foils. This is equally true when NCO-pre-adducts or monomeric diisocyanates are used.

Furthermore, aliphatic or heterocyclic amides, such as dimethylformamide, dimethylacetamide or N-methyl pyrrolidone advantageously serve as highly polar solvents for the reaction between diisocyanates and diamines, dimethylformamide preferably being employed because of its availability and favorable physical properties. Diamines, particularly hydrazine and aliphatic diamines such as ethylene diamine, show a clearly perceptible reaction with dimethylformamide within a few minutes, even at room temperature, to form formyl hydrazine and the corresponding formamides with elimination of dimethylamine. Similarly, with other amides, e.g. with dimethyl acetamide and hydrazine, there is formation of dimethylamine and acethydrazide. Since dimethylamine, formyl hydrazine, acethydrazide, the corresponding monohydrazides and mono-formylated diamines are monofunctional chain-breaking agents under the reaction conditions and any diformamides that may be formed no longer act as chain-lengthening agents, the properties of the product of polyaddition between the diisocyanates and diamines in dimethylformamide are continuously modified depending upon the reaction velocity, due to the instability of the reactants. More especially, the molecular weight of the polyaddition product falls during the reaction with diisocyanates, which has a correspondingly disadvantageous effect on the mechanical properties of the polyaddition products.

It is therefore an object of this invention to provide an improved process for preparing substantially linear polyaddition polymers. It is another object of this invention to provide an improved method which overcomes the disadvantages of those heretofore known. It is another object of this invention to provide a method of preparing such polymers without the danger of formation of unwanted side products. It is a further object of this invention to provide an improved method of preparing polyaddition polymers using less highly reactive components.

The foregoing objects and others which will become apparent from the following description are accomplished in accordance with the invention generally speaking by providing a process for the preparation of substantially linear polyaddition polymers by reacting an organic diisocyanate with a solution in a polar solvent of the reaction product of a diamine with either $CO_2$ or $SO_2$.

The reaction of diamines with $CO_2$ and $SO_2$ in polar solvents produces diamine-N-carboxylic acids and diamine-N-sulphinic acid respectively. In the case of hydrazine, the reaction products are more specifically referred to as carbazic acids and hydrazine-sulphinic acids respectively.

The diamine - N - carboxylic acids or diamine-N-sulphinic acids used in the process according to the invention are preferably prepared in polar solvents and added to the reaction without being first isolated. Diamine-N-carboxylic acids and diamine-N-sulphinic acids are generally to be understood to mean addition products of carbon dioxide or sulphur dioxide with diamines, such as are produced in the reaction of diamines with equivalent or excess quantities of carbon dioxide or sulphur dioxide in polar solvents. Any suitable diamine, such as, for example, hydrazines, aliphatic, cycloaliphatic, araliphatic, heterocyclic diamine and the like may be used.

By "hydrazines" is means not only hydrazine per se, but also substituted hydrazines such as lower alkyl hydrazines such as methyl hydrazine, ethyl hydrazine, butyl hydrazine and the like, hydroxyl alkyl alkoxy hydrazines such as hydroxypropyl hydrazine, hydroxy ethyl ethoxy hydrazines, hydroxy butyl butoxy hydrazines and the like and bis-hydrazines such as those having the formula

in which R represents any divalent organic radical, e.g. an alkylene radical, possibly interrupted by hetero atoms, or a substituted alkylene radical, e.g. hexamethylene-1,6-bis-hydrazine, N,N'-diamino-piperazine or, optionally alkyl-substituted, derivatives such as, 2,5-dimethyl-N,N'-diaminopiperazine. Hydrazine hydrate is preferably used for the production of the carbazic or hydrazine-sulphinic acids.

Any suitable organic diamine may be used, such as, for example, ethylene diamine, 1,2- and 1,3-propylene diamine, 1,4-butylene diamine, 1,6-hexanediamine, decane-1,10 - diamine, 2(3)-methyl-hexanediamine-1,6-cyclohexane-1,3- and -1,4 - diamine, cyclopentane - 1,3 - diamine, N,N'-dimethyl ethylene diamine, N,N'-dimethylhexane diamine, piperazine, 2,4-toluylene diamine, 2,6-toluylene diamine, 4,4'-diaminodiphenylmethane, phenylene diamine, 2,5-dimethylpiperazine, xylylene-1,3- or 1,4-diamine, diamines which contain hetero atoms such as oxygen or nitrogen in the chain are also suitable e.g. γ,γ'-diaminopropylether, 1,4 - phenylene - bis - (γ-aminopropylether), γ,γ'-diaminopropyl-methylamine.

Mixtures of any of the above mentioned diamines may be used. Further, mixtures of the diamines with hydrazides such as, for example, carbodihydrazide, adipic acid hydrazide, hexane-di-semicarbazide, butane-di-carbazinic acid ester, ω-aminobutyric acid hydrazide, ω-amino caproic acid hydrazide and the like and water, 1,4-butylene glycol, hydroquinone bis-oxyethylether and bis-N,N'-hydroxyethyl urea and the like may be used, the latter being used in minor amounts.

The diamine - N - carboxylic acids and diamine-N-sulphinic acids are prepared by adding the diamines or their solutions to polar organic solvents with amide or sulfoxide groups such as dimethylformamide, diethylformamide, dimethyl acetamide, diisopropyl acetamide, methoxymethyl acetamide, diisopropyl propionamide, dimethyl propionamide, N-methyl pyrrolidone, N-ethyl pyrrolidone, N-acetyl piperidine or dimethyl sulphoxide, which are saturated with carbon dioxide or sulphur dioxide. Alternatively, carbon dioxide may be introduced into a solution of diamine in polar solvents, the solution being as freshly prepared as possible, or alternatively, diamine-N-carboxylic acids may be prepared at temperatures of 0 to 60° C. by the addition of solid carbon dioxide. The same applies to the preparation of diamine-N-sulphinic acids, but owing to the better solubility of sulphur dioxide in many solvents, the sulphur dioxide may also be added, for example, in the form of a highly concentrated solution in dioxane. In most cases, fine suspensions of diamine-N-carboxylic acids or diamine-N-sulphinic acids are thereby formed. According to the invention, these acids can be smoothly reacted with diisocyanates at mild temperatures of —20 to +60° C., especially 0 to 30° C. to form elastomers.

It has been surprisingly found that the diamine-γ-carboxylic acids or diamine - N - sulphinic acids which are formed by the reaction between diamines and carbon dioxide or sulphur dioxide, preferably in polar solvents, react with considerably lower velocity with diisocyanates or the NCO-pre-adducts whose terminal NCO groups are derived mainly from the very active aromatic diisocyanate, so that the danger of formation of crosslinked products is considerably reduced.

Another surprising feature is that the reduced reaction velocity is nevertheless so high that the described reaction takes place within a few minutes at temperatures between —20 and +60° C., as compared with the above mentioned heat condensation which requires reaction temperatures of 80 to 130° C. A preferred temperature range for the new process is from —20° to 30° C.

During the reaction, carbon dioxide is split off from the diamine-N-carboxylic acids, and sulphur dioxide is split off from the diamine-N-sulphinic acids. In addition, diamine-N-carboxylic acids and diamine-N-sulphinic acids have a number of other important advantages compared with free diamines.

Highly polar solvents suitable for the reaction of diisocyanates or NCO-pre-adducts with diamines are aliphatic amides such as dimethylformamide, dimethyl acetamide, N-methyl pyrrolidone, dimethyl sulphoxide, dimethylformamide being particularly suitable owing to the fact that it is easily accessible and owing to its favorable physical properties. The formation of skin on the surface of molten or dissolved NCO-pre-adducts, which is often found to be a nuisance and which occurs when free diamines are used, owing to the volatility and high reactivity of the diamines, does not occur when NCO-pre-adducts are added to solutions or suspensions of diamine-N-carboxylic acids or diamine-N-sulphinic acids. Furthermore, the carbon dioxide formed in the reaction of diamine-N-carboxylic acids with NCO-pre-adducts acts as protective gas and inhibits the yellow discoloration of the solution which sometimes occurs due to the action of oxygen.

Carbazic acid can be prepared according to B. 37,4523 (1904), for example, by introducing $CO_2$ into concentrated aqueous or alcoholic hydrazine solutions while cooling, and can be isolated as a white, crystalline powder. On the other hand, dilute aqueous solutions of carbazic acid readily split up again into their components.

Carbazic acids are almost insoluble in polar solvents such as dimethylformamide or similar amides and even in very dilute solution, do not decompose with evolution of $CO_2$, as in aqueous solution.

It has been observed that when crystalline carbazic acids prepared according to B. 37, 4523 (1904) or other diamine-N-carboxylic acids or diamine-N-sulphinic acids prepared in the same manner are reacted with diisocyanates, such as dimethylformamide, dimethylacetamide or dimethyl sulphoxide, there is some reaction with evolution of $CO_2$, but this reaction often does not lead to an absolutely complete conversion, since reaction is greatly retarded or does not take place completely, for example, due to inclusion of the carbazic acid crystals or diamine-N-carboxylic acids in the polyaddition product.

On the other hand, it is found that solutions and suspensions which are produced, for example, by the addition of diamines to solutions of carbon dioxide or sulphur dioxide in dimethylformamide or other polar solvents and which generally contain the reaction product diamine-N-carboxylic acid or diamine-N-sulphinic acid in an extremely finely divided form can be smoothly and completely converted to the desired elastomers in the subsequent reaction with NCO-pre-adducts, carbon dioxide or sulphur dioxide being split off in the process.

In the same way, solutions or suspensions which can be obtained by introducing carbon dioxide or sulphur dioxide into fresh solutions of diamines in dimethylformamide or other polar solvents are also suitable.

It was surprising to find that such reaction products of diamine with carbon dioxide or sulphur dioxide in polar solvents can be reacted so smoothly and well with diisocyanate or NCO-pre-adducts without side reactions occurring in spite of the fact that side reactions with active hydrogen atoms could have been expected owing to the possible presence of COOH or SOOH groups.

By the term "organic diisocyanate" is meant both monomeric diisocyanates and NCO-pre-adducts. The pre-adducts are prepared by reacting high molecular polyhydroxyl compounds having terminal OH groups with diisocyanates. For the polyhydroxyl compounds, it is advantageous to use substantially linear products having a molecular weight of about 500 to 5000 and melting points below 50° C.

Any suitable monomeric organic diisocyanate may be used, such as, for example, aliphatic, cycloaliphatic, araliphatic, aromatic and heterocyclic diisocyanates such as, ethylene diisocyanate,
hexamethylene diisocyanate,
cyclopentylene-1,3-diisocyanate,
cyclohexane-1,4-diisocyanates,
1,2,3,4,5,6-hexahydrodiphenylmethane-4,4'-diisocyanate,
toluylene-2,4-diisocyanate,
2,6-toluylene diisocyanate,
xylylene diisocyanate,
phenylene-1,4-diisocyanate,
diphenyl-4,4'-diisocyanate,
diphenylmethane-4,4'-diisocyanate,
diphenylmethane-3,3'-diisocyanate,
diphenyldimethylmethane-4,4'-diisocyanate,
stilbene-4,4'-diisocyanate,
benzophenone-4,4'-diisocyanate,
diphenylether or
diphenyl sulphide diisocyanates, as well as their substitution products e.g., derivatives substituted with alkyl, alkoxyl, halogen or nitro groups, such as 3,3'-dimethyl- or 3,3'-dimethoxy- or 3,3'-dichlorodiphenylmethane-4,4'-diisocyanates. Diisocyanates of the naphthalene series or heterocyclic diisocyanates, e.g. of benzofuran or diisocyanates comprising urea and uretdione groups such as the dimer of toluylene diisocyanate can also be used.

Symmetrical diisocyanates such as diphenyl-4,4'- or diphenylmethane-4,4'-diisocyanates are preferably used. Triisocyanates can also concurrently be employed in small quantities, up to 5%.

Any suitable substantially linear polyhydroxyl compounds such as, for example, polyesters, polyester amides, polyester ethers, polyether, polythioethers, polyether thioethers, polycarbonates and polyacetals may be used to prepare the NCO-pre-adducts. Mixtures of the said polyhydroxyl compounds may be used for obtaining special effects, e.g. mixtures of polyesters and polyethers. Furthermore, polyesters, for example, may contain other groups which form linear linkages, such as ether, thioether and acetal groups. Flame-resistant polymers can be obtained by using starting materials which contain halogen and/or phosphorous atoms. Specifically, polyesters or polyester amides such as those obtainable by known methods may be used, for example. They may be prepared from polyfunctional, particularly bifunctional alcohols, amino alcohols, hydroxycarboxylic acids, lactones, aminocarboxylic acid, cyclic carbonates and polycarboxylic acids; the number and type of end groups may be varied by suitable choice of the proportions of the components. To lower the melting point of the polyhydroxyl compounds, mixtures of the above-mentioned compounds may be used or a modification may be carried out by using less than molar quantities of diisocyanates. For example, polyesters may be reacted with diisocyanates, e.g. toluylene diisocyanates in molar ratios of 2:3 to 3:2 to form polyester urethanes with terminal hydroxyl groups.

Any suitable polyester may be used such as those prepared by reacting dihydric alcohols with dicarboxylic acids or by polycondensation of hydroxy-carboxylic acids or lactones. Any suitable dihydric alcohols such as ethylene glycol, 1,4-, 1,3- and 2,3-butanediol, 1,2- or 1,3-propylenediols, pentanediols, hexanediols, such as 1,5-pentanediol or 1,6-hexanediol, 2-methyl- or 3-methylhexanediol-1,6-, 2,2-dimethyl-1,3-propanediol, 1,3- and 1,4-cyclohexanediol, 1,3- and 1,4-bis-hydroxymethylcyclohexane, diethylene glycol, bis-beta-hydroxyethyl-methylamine or bis-2-hydroxypropyl-methylamine may be used.

Any suitable dicarboxylic acid may be employed, such as adipic acid, oxalic acid, succinic acid, glutaric acid, methyl-adipic acid, pimelic acid, suberic acid, sebacic acid, the mixture of $C_{10}$-dicarboxylic acids known as iso-sebacic acid, acelaic acid, ricinoleic acid, dimeric acids, aliphatic acids with hetero atoms such as thiodipropionic acid, 3-oxapentanedioic acid-1,5, 4-oxa-hexanedioic acid-1,7, N-methyl-bis-propionic acid, cycloaliphatic acids such as 1,3- or 1,4-cyclohexane-dicarboxylic acids, aromatic acids such as phthalic acid, isophthalic acid, terephthalic acid or maleic acid, fumaric acid and the like. The polyesters may also be formed, at least in part, by reaction of hydroxy-carboxylic acids, such as ω-hydroxybutyric acid, ω-hydroxy-valeric acid, ω-hydroxy-caproic acid, 1-hydroxy-4-carboxy-cyclohexane or corresponding lactones such as beta-lactone, γ-butyrolactone, δ-valerolactone, ε-caprolactone or substituted derivatives thereof.

The polyesters can be modified by incorporating other substances, e.g. by formation of polyesteramides. Examples are hydroxycarboxy acids and lactones, aminocarboxylic acids such as ω-aminocaproic acid, ω-aminooctoic acid, ω-amino-undecanoic acid or their lactams such as caprolactam, pyrrolidone, capryllactam, lauryllactam, aminoalcohols such as aminoethanol, aminopropanol, diamines such as ethylene diamine, piperazine, hexamethylene diamine, m-xylylene diamine, 4,4'-diamino-diphenyl-dimethylmethane, 4-oxa-7-diaminoheptane and the like may be used.

Compounds with more functional groups, such as trimethylol propane and hexane triols or tricarboxylic acids can concurrently be used to a small extent.

Because they are much more stable to hydrolysis, it is preferred to use polyesters with components containing at least 5 carbon atoms, for example, esters of adipic acid and 2,2-dimethylpropanediol, mixtures of hexane-1,6-diol with 2,2-dimethyl-propanediol or the mixture of the 2(3)-methyl-1,6-hexanediols. These esters can also be transformed by reaction with excess quantities of diisocyanates, particularly toluylene diisocyanate, into the polyester urethanes.

Any suitable polyalkylene ether glycols may be used such as those obtained by adding alkylene oxides to water, diamines, difunctional or trifunctional alcohols or aminoalcohols, and also more especially the polytetramethylene glycol ether formed by polymerization of tetrahydrofuran with acid catalysts, or its copolymers, e.g. with small proportions of ethylene oxide or propylene oxide units. The polyalkylene ether glycols may be prepared by any known process such as, the process described by Wurtz in 1859 and in the "Encyclopidia of Chemical Technology," vol. 7, pp.257–262, published by Interscience Publishers in 1951 or in U.S. Patent 1,922,459. Similarly, any suitable polyacetals obtained, for example, according to German patent specification Nos. 1,039,744 and 1,045,095 from polyalcohols and formaldehyde or according to U.S. Patent No. 2,870,097, polyester acetals from formaldehyde and diols containing ester groups and polythioethers which are obtained by condensing thiodiglycol with itself or other polyalcohols, e.g. according to German patent specification No. 1,039,232 may be used. Here also, it is often advantageous to modify the product, e.g. by reaction with less than equivalent quantities of diisocyanate.

The preferred range of molecular weights of the polyhydroxyl compounds, in the form in which they are further reacted with polyisocyanates to form prepolymers with terminal isocyanate groups, is from about 1000 to about 3500. It is, however, also possible to use polyhydroxyl compounds with molecular weights from 600 to 1000, if these compounds are reacted with less than molar quantities of diisocyanates and the resulting polyhydroxyl compounds containing urethane groups are used as starting components for the reaction with excess of polyisocyanate or if the OH/NCO-ratio in the reaction of the polyhydroxyl compounds with the diisocyanate is less than 1:2 (e.g. 1:1.5).

For modification purposes, it is also possible concurrently to use small quantities of difunctional compounds of low molecular weight (e.g. butanediol) or compounds of higher function, e.g. trifunctional alcohols such as trimethylol propane in addition to the substantially linear polyhydroxyl compounds of higher molecular weight, in the reaction with diisocyanates. Generally speaking, however, the quantity of the trifunctional additives should not corespond to more than 5% of the OH number of the polyhydroxyl compound.

By incorporation of 0.5 to 5% of silicone compounds of higher molecular weight, such as dimethyl polysiloxanes, particularly of organofunctional nature into which —OH—, $MH_2$— or —COOH— terminal groups can be incorporated, there is imparted a water-repellent effect on the elastomers with improvement of the hydrolysis properties.

To prepare the NCO-pre-adducts, the high molecular weight hydroxyl compounds are reacted with diisocyanates, one mol of polyhydroxyl compound being used with about 1.5 to 3.5 mols, preferably 1.5 to 2.0 mols of diisocyanate. The polyhydroxyl compounds, which may, if desired, be dried by heating for about one hour at about 100 to about 130° C. in a vacuum of 6 to 50 mm. Hg are reacted with the diisocyanates in known manner in the molten state at about 60 to about 130° C., preferably 90 to 110° C., or by reaction in inert solvents such as methylene chloride, carbon tetrachloride, benzene, chlorobenzene, methyl-ethyl-ketone, tetrahydrofuran, dioxane, glycol monomethylether acetate, or glycol formal, in the presence of catalysts if desired.

When the reaction is carried out in solvents such as methylene chloride, these solvents may be distilled off as the reaction proceeds or the NCO-pre-adduct may remain dissolved in the solvent, e.g. dioxane, because these solutions of NCO-pre-adducts are generally easier to work up owing to their lower viscosity. However, at elevated temperatures, (80 to 100° C.) the molten NCO-preadducts which are free from solvents also have viscosity values which enable them to be dissolved or mixed rapidly in the subsequent reaction. The preparation of NCO-preadducts should preferably be carried out continuously. Dosed quantities of polyhydroxyl compounds and diisocyanates may be passed either in the solid state or in solution through a heated reaction zone, the result of the pre-adduct formation being determined mainly by the reaction temperature and the duration of dwell. When easily volatile solvents such as methylene chloride are used for this reaction, they may be removed again, e.g. over a thin-film evaporator, using a vacuum if desired. The mass of pre-adduct, heated to about 80 to 120° C. may then be supplied continuously in dosed quantities to the next reaction stage.

The reaction between diamine-N-carboxylic acids or diamine-N-sulphinic acids and diisocyanates or NCO-preadducts is preferably carried out by introducing a solution of the diisocyanates or NCO-pre-adduct and thoroughly mixing, stirring or centrifuging the components. The reaction takes place with liberation of carbon dioxide or sulphur dioxide, most of the sulphur dioxide remaining in solution in the reaction medium. The turbidity in the suspended diamine-carbon dioxide or sulphur dioxide adducts disappears as the reaction proceeds. This is carried out mainly with equivalent quantities of diisocyanates or NCO-pre-adducts and diamine-N-carboxylic acids or diamine-N-sulphinic acids, although a deficient quantity of diisocyanates or NCO-pre-adducts may also be added, and slowly reacting diisocyanates may then be added so that the build-up of the molecules takes place under well controllable conditions as described in copending U.S. application Ser. No. 306,271. It is advantageous to remove dissolved carbon dioxide or sulphur dioxide before the product is formed or molded, the removal being effected, for example, by evaporation in vacuo.

If the polyaddition products formed are insoluable in the solvents, such as dimethylformamide, it is possible to use dimethylformamide/LiCl mixtures or other mixtures as described in German patent specification No. 1,107,399.

Non-elastic polyaddition products are usually obtained from monomeric diisocyanates:resinous diisocyanates, i.e., reaction products which comprise free NCO groups and are obtained from polyhydroxyl compounds of higher molecular weight and an excess of diisocyanate, generally give elastic polyaddition products.

The elastomer solution may be pigmented, preferably with white pigments such as titanium dioxide (rutile) in a finely divided form, in quantities of about 0.1 to 10%. Other pigments, e.g. pigments based on silicate, or other colorless or colored inorganic or organic pigments may also be incorporated. Compounds such as magnesium stearate, tin-II-palmitate or other salts of higher fatty acids may also be added to the solution.

The stability of the products to light, oxygen and ozone and/or the response to combustion gases may be improved by the addition of agents which protect against light and oxidation. A number of such compounds are given, for example, in the above stated copending application.

Furthermore, aliphatic primary, secondary or tertiary amines are suitable as stabilizers, e.g. dihydroabietylamine, but preferably amine polymers such as polyethyleneimine or poly - N,N' - diethyl - beta-aminoethyl methacrylate. Very good stabilization is obtained also by means of hydrazide compounds according to copending application Ser. No. 264,776 or by compounds which contain the ethylene imide group as disclosed in application Ser. No. 266,079. The incorporation of piperazine, for example, into the polyester components, gives products which are faster to light. The additives which stabilize against the effects of light, oxidation and ozone or prevent discoloration are added in quantities of 0.1 to 7% to the solutions of the products when the reaction is completed. Alternatively, they may be applied in solid, dispersed or dissolved form onto the finished elastomers by immersion, spraying or powdering. Dyestuffs, dyestuff pigments and so-called optical brighteners may also be added to the solutions. By introducing into the solution suitable substances which have a crosslinking action at higher temperatures, for example, polyethylene imides or polyepoxides or compounds which split off polyisocyanate, the materials obtained after the product has undergone a forming process, particularly if they are in an oriented state, e.g. after they have undergone a preliminary twisting process may be subjected to a subsequent crosslinking reaction by heating.

The products of the process may be formed from the solution by known processes, e.g. by dry spinning or wet spinning or by casting them into foils and evaporating off the solvent. Alternatively, the substance may be precipitated by pouring it into a non-solvent such as water, alcohols, ether or acetic acid, and the substance isolated by this method can then be dissolved in suitable solvents such as formic acid, trifluoroacetic acid, dimethyl sulphoxide, tetramethylene sulphone, dimethylformamide or others, and then formed.

A preferred method of forming the elastomer solution makes use of the dry spinning process. The solutions having viscosities of at least 300 p./20° C. are spun through spinning nozzles into a shaft which is heated to about 150 to 250° C. and into which air or inert gases at a temperature of about 150 to 330° C. is blown, multi-filament threads with low individual deniers being obtainable by using multi-aperture nozzles. By suitably controlling the spinning process, the individual fibers may be obtained unadhered or alternatively, the individual threads are allowed to come into contact at the lower end of the spinning shaft or after leaving the shaft, so that the thread obtained appears to be a monofil but this thread can be broken up fairly easily into its individual threads by mechanical action.

When the product is formed by a wet spinning process, the viscous solution (about 0.5 to 1000 p./20° C.) is spun into hot water or solvent mixtures, e.g. into aqueous solutions containing portions of dimethylformamide, dimethyl sulphoxide or glycol.

To control the formation of the thread, it is sometimes advantageous if the spinning solution contains, in addition to the polar solvents such as dimethylformamide, also other solvents such as dioxane, chlorobenzene, nitrobenzene, benzyl alcohol, tetrachloroethane, etc. The threads are freed from residues of solvent by washing them thoroughly and, if necessary, leaving them to stand for some time in hot water.

The mechanical and elastic properties of the elastomeric filaments can sometimes be improved by thermal aftertreatment e.g., by heating the fibers for example, at 90 to 150° C., or by boiling for a short time in water. If the filaments have an orientation or an elongation as a result of the spinning process or by initial stretching, this orientation can be set by a thermal heating process on spools (e.g. 6 hours at 80° C., 4 hours at 100° C., 1 hour at 130° C.), the mechanical and elastic properties of the filaments being greatly modified. Thus, the breaking elongation of the filaments decreases somewhat, but on the other hand the modulus of the filaments increases considerably according to the initial elongation. The tendency of initially-oriented filaments to shrink can also be reduced or eliminated by heat-setting. On heating for a relatively long time at very high temperatures, e.g. 150 to 180° C., plastic flow processes occur, and the moduli of the filaments are considerably reduced.

By simultaneous crosslinking of the filaments with polyethyleneimide compounds with initial stretching, in accordance with the process disclosed in U.S. application Ser. No. 266,079, there are obtained filaments which are insoluble in solvents, such as dimethylformamide or solvents such as are used for dry cleaning purposes, and have more favorable elastic properties, more especially improved elastic recovery after the filaments have been stretched.

The highly viscous solutions obtained by the process of the invention may, according to Belgian patent specification 586,958, be spun together with another thread-forming solution such as polyacrylonitrile into dimethylformamide through suitable nozzles to form a 2-component thread.

Suitable elastomer substances obtained by removing the solvent (by evaporation or coagulation) can be converted into threads or foils by melt-spinning processes or by extrusion.

The highly elastic threads obtained by spinning the elastomer solutions have excellent physical properties, high elastic elongation (400 to 900%), relatively high moduli of elasticity and good elastic recovery after repeated stretching. As the threads are highly abrasion resistant and stable to oxidation and to the action of cosmetic oils, and are easily dyed, they may advantageously be used instead of threads of vulcanized rubber for producing many different types of rubbery elastic fabrics. These fabrics may be used particularly in the corset industry for producing elastic bands, stocking tops, medical hoses, swimsuits and other articles. The highly elastic polyurethane fibers can be worked up in mixtures (3 to 50%) with ordinary textile fibers, in which the elastomer threads may, in some cases, be in a more highly stretched state, where fabrics of high elasticity, good crease-resistance and resistance to pilling can be obtained.

The elastomer solutions may be used not only for producing foils and threads but also for producing coatings, e.g. for textiles. In addition, they can be used as auxiliary agents for finishing textiles or fixing pigments in textile printing processes.

The invention is further illustrated but not limited by the following examples in which parts are by weight unless otherwise specified.

Example 1

About 1000 parts of a polyester of adipic acid, ethylene glycol and butane-1,4-diol (glycol ratio 1:1; OH number 57.5; acid number 1.3) are dehydrated in water jet vacuum for about one hour at about 130° C. and, after cooling to about 65° C., there are added about 229.5 parts of solid diphenylmethane - 4,4' - diisocyanate and about 307.5 parts of anhydrous dioxane. The mixture is heated in a boiling water bath while stirring under an atmosphere of nitrogen for about 120 minutes at an internal temperature of about 99 to about 100° C. and then cooled quickly to room temperature. The solution of the adduct has a viscosity of 250 p./20° and an NCO content of 2.14%.

(a) About 268 parts of dimethylforamamide are saturated with $CO_2$ by adding solid carbon dioxide and about 1.275 parts of hydrazine hydrate are added while stirring to the solution cooled to about +5° C. A finely divided suspension is formed, into which about 100 parts of the above adduct solution are introduced over 5 minutes while stirring rapidly. The cloudiness disappears as the reaction proceeds, the viscosity of the solution steadily increases and carbon dioxide escapes from the solution. A colorless, homogeneous, gel-free solution is formed with a concentration of 22% and a viscosity of 560 poises/20° C. The $\eta_i$=value of the elastomer in hexamethyl phosphoric amide (1 g./100 cc.) is 1.07.

A film is cast from the elastomer solution and the foil obtained, after drying at 70 to 100° C. and with a thickness of 0.15 mm. is cut to form filaments. These have the following properties:

| | |
|---|---|
| Count _____den__ | 866 |
| Tensile strength _____g./den__ | 0.68 |
| Breaking elongation _____percent__ | 870 |
| Tension value at 300% _____mg./den__ | 105 |
| Tension value at 150% _____mg./den__ | 26 |
| Elastic recovery _____percent__ | 83 |

(b) If the reaction is carried out in the same way, but with a carbazic acid suspension which has already stood for one hour at 25° C., there is likewise obtained a colorless, homogeneous solution which has a viscosity of 380 poises/20° C. The $\eta_i$ value of elastomer substance is 1.05. The mechanical and elastic properties are practically unchanged in comparison with (a).

Comparison experiment in connection with Example 1

Two portions of 1.275 parts of hydrazine hydrate are each dissolved in about 268 parts of dimethylformamide at room temperature and, after different standing times (0.1 and 7 hours), about 100 parts of adduct solution are introduced into each of these solutions in the same manner as in (b). Solutions are then obtained which are not completely homogeneous but contain small proportions of gelling substance. When the adduct solution is cast, surface skins are formed due to hydrazine vapors, which greatly impede flow. In addition, there is a considerable lowering of the molecular weight (or $\eta_i$ value), depending upon the standing time of the solution (see Table I). The properties of the elastomers deteriorate as the molecular weight falls; valuable elastomer products are only obtained at $\eta_i$ values$\geq$0.90.

TABLE I

| | Standing time hydrazine hydrate in dimethyl formamide (hours) | Solution viscosity (poises/ 20° C.) | Appearance of the solution | $\eta_i$-value (10 g./l. in hexamethylene phosphorus amide/20°) | Hydrazine solution before the polyaddition |
|---|---|---|---|---|---|
| I | 0 | 615 | Containing gel-like fractions | 1.09 | Faint odor (hydrazine). |
| II | 1 | 59 | Not completely homogeneous | 0.89 | Strong ammonia-odor (dimethylamine). |
| III | 7 | 9 | Very low viscosity | 0.50 | Very strong ammonia-odor (dimethylamine). |

The mechanical and elastic properties of the foils obtained from the above elastomer solutions I to III or of filaments cut from them are set out in Table II. The films I and II are inhomogeneous due to gelling substances.

TABLE II

| | I | II | III |
|---|---|---|---|
| Filament properties (cut from films): | | | |
| Count (den.) | 920 | 873 | Film breaks on being detached from support. |
| Tensile strength (g./den.) | 0.70 | 0.52 | |
| Breaking elongation (percent) | 930 | 890 | |
| Tension value at 300% (mg./den.) | 106 | 101 | |
| Tension value at 150% (mg./den.) | 26 | 23 | |
| Elastic recovery (percent) | 83 | 82 | |

The considerable decrease in viscosity of the solutions (or the greatly reduced molecular weight of the polyaddition products) with increasing standing time of the hydrazine/dimethylformamide solutions is to be attributed to a conversion of these components, in which dimethylamine and formyl hydrazide are formed. These reaction products, as monofunctional reactants, stop the polyaddition.

The formation of dimethylamine is shown as follows:

A stream of nitrogen is passed through a hydrazine/dimethylformamide solution which has already stood for some time and then through a washing bottle containing a solution of phenyl isocyanate in dioxane. N-phenyl-N', N'-dimethyl urea is isolated from the wash liquid. When a hydrazine/dimethylformamide solution is heated for several hours at 100° C., it is possible, after distilling off excess dimethylformamide, to obtain practically a quantitative yield of formyl hydrazide.

Measuring process

To determine the $\eta_i$-value $$\eta_i = \frac{\ln \eta R}{c}$$

the polymer is dissolved at 20° C. with a concentration c.=1 g./100 cc. in phosphoric acid tris-dimethylamide and the measurement takes place in an Ubbelohde viscosimeter at 20° C. The measurement of the elastic properties of filaments or films is carried out using the elastotensograph described in "Chimia," 16, 93–105 (1962). The tension value is determined at 300% elongation when the filament is first stretched at a rate of 400%/minute, and also the tension value at 150% elongation in the third relaxation cycle after stretching three times to 300% at a rate of 400%/minute, as well as the elastic recovery after carrying out the stretching and relaxation cycles three times (300% stretch, 400%/minute rate of stretch) 30 seconds of relaxing the filament.

Example 2

About 250 parts of a practically anhydrous polyester obtained from adipic acid, hexanediol and 2,2-dimethyl-1,3-propanediol (glycol ratio 6:4; OH number 59.8; acid number 1.6) are mixed at about 60° C. while stirring with about 55 parts of diphenylmethane-4,4'-diisocyanate and heated for about 50 minutes at about 98° C. After cooling to about 60° C., the adduct is diluted with about 305 parts of chlorobenzene and the homogeneous solution is cooled to room temperature. The solution has a viscosity of 6.7 poises/20° C. and an NCO content of 1.04%.

Frozen carbon dioxide is introduced into a solution of about 2.13 parts of hydrazine hydrate in about 458 parts of dimethyl sulphoxide until it is saturated. The carbazic acid formed remains in solution. While stirring, about 314 parts of the above adduct solution in chlorobenzene are introduced into the said solution; there is evolution of $CO_2$ when most of the solution has been added. A very clear substantially 21% solution is formed, the viscosity of which is 141 poises at 20° C. $\eta_i=0.89$ (1% in hexamethylene phosphorus amide).

The solution is spun through a spinneret having 10 apertures (0.12 mm. bore) into a water bath at about 90° C. and after passing through a washing zone of six meters (temperature of water about 90° C.) at a speed of about 10 m./min., the filament is wound onto a spool. The filament is subsequently treated in water at about 50° C. for one hour. After drying, the following filament properties are found:

Count _____den__ 136
Tensile strength _____g./den__ 0.39
Breaking elongation _____percent__ 450
Tension value at 300% _____mg./den__ 255
Elastic recovery _____percent__ 85

If dimethylformamide is substituted by dimethyl acetamide in the foregoing example, practically identical results are obtained.

Example 3

About 500 parts of polytetramethylene ether glycol (OH number 102) which are dehydrated with addition of one part by volume of concentrated hydrochloric acid for about 1 hour at about 130° C./12 mm. Hq are mixed at about 90° C. with about 39.7 parts of toluylene-2,4-diisocyanate and heated for about 1 hour in a boiling water bath. This polyether urethane with terminal hydroxyl groups is heated with about 114 parts of diphenylmethane-4,4'-diisocyanate and about 653.5 parts of dioxane for about 1½ hours at an internal temperature of about 98 to about 99° C. After cooling the solution, the NCO content is 1.47%.

A suspension of the carbazic acid is prepared from a freshly prepared solution of about 9.19 parts of hydrazine hydrate (105 mol percent) in about 896 parts of dimethylformamide, by introducing excess carbon dioxide. About 1000 parts of the above adduct solution are then added while stirring strongly in an atmosphere of nitrogen. Carbon dioxide is given off and a colorless, clear elastomer solution is obtained with a solids content of 26.5% and a viscosity of 80 poises at 20°.

A film is produced from the solution by means of suitable casting devices and this film is cut into narrow filaments.

For comparison, the solution is spun through a spinneret having 10 apertures/0.12 mm. into water at about 90° C., washed for about 10 minutes in hot water and reeled onto spools at a speed of about 10 m./min. After standing for about another two hours in water at 90° C., the spools are dried.

The following values were measured in respect of the highly elastic filaments:

|  | Filaments cut from foils | Wet-spun filaments |
|---|---|---|
| Count (den.) | 900 | 160 |
| Tensile strength (g./den.) | | 0.37 |
| Breaking elongation (percent) | 700 | 670 |
| Tension value at 300% (mg./den.) | 90 | 150 |
| Tension value at 150% (mg./den.) | 20 | 21 |
| Elastic recovery (percent) | 80 | 80 |

Example 4

About 1.1 parts of hexane-1,6 diisocyanate are introduced into about 1500 parts of the elastomer solution according to Example 3, which still contains free semicarbazide terminal groups, after pigmentation with about 12 parts of $TiO_2$ (rutile). By reaction with the semicarbazide terminal groups, the molecular weight of the polymer is considerably increased and the viscosity of the solution rises to 560 poises at 20° C.

The highly viscous solution is spun through a spinneret having 16 apertures with a diameter of 0.20 mm. and into a shaft heated to about 220° C. and the filaments are withdrawn from the shaft at a withdrawal speed of about 80 m./min., the individual capillaries coming into contact with one another at the bottom end of the shaft and slightly sticking together. Before the winding operation, a preparation (stannous stearate in paraffin oil/polyethylene oxide suspension) is applied to the filaments and winding is carried out at different speeds (81 m./min. and 120 m./min.). By subsequent heating of the filaments on the spools (3 h./100° C.) the initial elongation introduced into the filaments is set and also the shrinkage on boiling of the filaments practically disappears.

Some of the properties of the elastomeric filaments thus obtained, depending on the elongation after the setting, are set out in the following table:

|  | V=0 (81 m./min.) | V=50% (120 m./min.) |
|---|---|---|
| Count (den.) | 198 | 157 |
| Tensile strength (g./den.) | 0.55 | 0.60 |
| Breaking elongation (percent) | 690 | 605 |
| Tension value at 300% (mg./den.) | 95 | 145 |
| Tension value at 150% (mg./den.) | 20 | 23 |
| Elastic recovery (percent) | 84 | 84 |

Example 5

About 150 parts of a polyester of ethylene glycol, butylene-1,4-glycol (molar ratio 1:1) and adipic acid (molecular weight 2000) are dehydrated for about one hour in vacuo at about 110° C. and heated with about 33 parts of diphenylmethane-4,4'-diisocyanate for about 50 minutes at about 100° C. The melt of the adduct formed is then dissolved in about 150 parts of anhydrous dioxane. The NCO content, determined by titration, is 1.28%.

About 5 parts of a 30% solution of sulphur dioxide in dioxane are added to about 160 parts of dimethylformamide followed by about 0.84 part of hydrazine hydrate. After adding the hydrazine hydrate, the solution assumes a milky cloudiness. About 100 parts of the adduct solution is allowed to flow immediately into this suspension, followed by about 20 parts of dimethylformamide.

While the milky cloudiness is disappearing, a strong increase in viscosity in the solution is observed. The 20% solution has a viscosity of 140 p./20° C.

The solution is cast to form films, and the solvent is removed by heating for about one hour at about 100° C. The films thus produced have the following properties:

| | |
|---|---|
| Thickness mm | 0.1 |
| Tensile strength kg./cm.$^2$ | 595 |
| Breaking elongation percent | 715 |
| Tension value at 300% elongation kg./cm.$^2$ | 100 |
| Further tearing strength according to Graves kg./cm. | 36 |
| Microhardness | 58 |

By spinning the solution by means of a wet-spinning arrangement into a precipitating bath of hot water, highly elastic filaments having the following properties are obtained:

| | |
|---|---|
| Count den | 116 |
| Tensile strength (related to the original count) g./den | 0.49 |
| Breaking elongation percent | 660 |
| Tension value at 300% mg./den | 139 |
| Tension value at 150% mg./den | 25 |
| Elastic recovery percent | 86 |

Example 6

About 10,000 parts of carbon dioxide gas are introduced into a solution of about 110 parts of dimethylformamide/lithium chloride (95:5 parts), and about 5.0 parts of hydrazine hydrate are added. A solution of about 25 parts of 4,4'-diphenylmethane diisocyanate in about 50 parts of dimethylformamide is then run in while stirring at about 25° C. A clear solution is formed from the suspension, during the reaction, the viscosity of the solution increasing considerably.

The polymeric hydrazodicarbonamide can easily be precipitated in water. Films and filaments of high melting point can be produced from the solution and these films and filaments start to sinter at about 160° C. The $\eta_i$ value is 0.67 (measured as 1% solution in dimethylformamide/lithium chloride —95:5).

A comparison bath without use of carbon dioxide leads to a completely gelled reaction mass when the isocyanate solution is added.

Example 7

(a) Preparation of NCO-pre-adduct.—About 150 parts of a polyester of adipic acid and ethylene glycol and butane-1,4-diol (molar ratio of glycols 1:1) and having an hydroxyl number of 56 are dried for about one hour at about 130° C. in a vacuum produced by a water jet, and when cooled to about 95° C., are treated with about 33.5 parts of diphenylmethane-4,4'-diisocyanate. The melt is heated for about 50 minutes to an internal temperature of about 100° C. and then dissolved in about 150 parts of anhydrous dioxane and quickly cooled to room temperature. The solution of NCO-pre-adduct has an NCO content of 1.40%.

(b) Reaction with diamine-N-carboxylic acid.—About 5 parts of solid carbon dioxide are added to a freshly prepared solution of about 1.10 parts of ethylene diamine in about 120 parts of dimethylformamide. A fine suspension is formed, to which about 100 parts of the NCO-pre-adduct solution prepared as described above, are added while rapidly stirring over the course of about 5 minutes. The turbidity disappears as the reaction proceeds, and the viscosity of the solution increases and carbon dioxide escapes from the solution. A colorless solution, free from gel and having a concentration of 25.3% and a viscosity of 100 p./20° is produced.

The elastomer solution is poured into a film and the foil thus produced which is about 0.10 mm. in thickness, obtained by drying at 70 to 100°, is cut into threads. These threads have the following properties:

| | | |
|---|---|---|
| Titre | den | 500 |
| Tear strength | g./den | 0.06 |
| Elongation at break | percent | 820 |
| Tension at 300% | mg./den | 100 |
| Tension at 150% | mg./den | 25 |
| Elastic recovery | percent | 88 |

(c) Reaction with diamine-N-sulphinic acid.—About 5 parts of a 30% solution of sulphur dioxide in dioxane are added to a freshly prepared solution of about 1.10 parts of ethylene diamine in about 180 parts of dimethylformamide. A fine suspension is formed to which about 100 parts of the NCO-pre-adduct solution, prepared as described above, are added while rapidly stirring in the course of the next 5 minutes. The turbidity disappears as the reaction proceeds, and the viscosity of the solution increases greatly. The colorless, non-gelling, viscous solution thereby formed has a concentration of 19.8%.

The solution is spun into a water bath at about 90° C. through a nozzle with 10 apertures (0.12 mm. bore) and after passing through a washing path of 6 m. (water at 90° C.); it is wound onto a spool at the rate of 10 m. per minute. The thread is then treated for one hour in water heated to 50° C. When dry, the thread has the following properties:

| | | |
|---|---|---|
| Titre | den | 120 |
| Tear strength | g./den | 0.51 |
| Elongation at break | percent | 670 |
| Tension at 300% | mg./den | 140 |
| Tension at 150% | mg./den | 25 |
| Elastic recovery | percent | 80 |

The elastomer solution is poured into a film. The foil obtained after drying at 70 to 100° C. has the following properties:

| | | |
|---|---|---|
| Thickness | mm | 0.1 |
| Tear strength | kg./cm.$^2$ | 547 |
| Elongation | percent | 630 |
| Tension at 300% | kg./cm.$^2$ | 117 |
| Resistance to further tearing | kg./cm | 57 |
| Microhardness according to Graves | | 55 |

Example 8

(a) Preparation of NCO-pre-adduct.—About 100 parts of the polyester described in Example 7 are dried and treated with about 20.1 parts of diphenylmethane-4,4'-diisocyanate. The melt is heated for about 45 minutes to an internal temperature of about 100° C. and then dissolved in about 100 parts of anhydrous dioxane and then quickly cooled to room temperature. The solution of NCO-pre-adduct has an NCO content of 0.90%.

(b) Reaction with diamine-N-carboxylic acid.—About 5000 to 10,000 parts by volume of carbon dioxide are introduced into a freshly prepared solution of about 1.34 parts of cyclohexane-1,4-diamine in about 120 parts of dimethylformamide. About 100 parts of the NCO-pre-adduct solution prepared as described above are then added in the course of the next 5 minutes to the suspension formed, the mixture being stirred rapidly at the same time. The turbidity disappears as the reaction proceeds, and a viscous solution is formed.

The elastomer solution is poured into a film as in Example 7. Whey dry, the foil has the following properties:

| | | |
|---|---|---|
| Thickness | mm | 0.1 |
| Tear strength | kg./cm.$^2$ | 400 |
| Elongation | percent | 775 |
| Tension at 300% | kg./cm.$^2$ | 71 |
| Resistance to further tearing (according to Graves) | kg./cm | 48 |
| Microhardness | | 52 |

Example 9

(a) Preparation of NCO-pre-adduct.—About 100 parts of a polyester of adipic acid, hexane-1,6-diol and 2,2-dimethylpropane-1,3-diol (molar ratio of glycols 65:35) having a hydroxyl number of 61.4 are dried as in Example 7, cooled to about 95° C. and treated with about 24.0 parts of diphenylmethane-4,4'-diisocyanate. The melt is heated for about 45 minutes to an internal temperature of about 100° C. and then dissolved in about 100 parts of anhydrous dioxane and then quickly cooled to room temperature. The solution of the NCO-pre-adduct has an NCO-content of 1.43%.

(b) Reaction with diamino-N-carboxylic acid.—About 5 parts of solid carbon dioxide are added to a freshly prepared solution of about 3.53 parts of piperazine hexahydrate in about 135 parts of dimethylformamide. About 100 parts of the NCO-pre-adduct solution described above is then poured with rapid stirring in the course of the next 5 minutes to the suspension thereby formed. $CO_2$ is evolved and the diamino-N-carboxylic acid suspension disappears and a highly viscous solution is formed. A foil which has an elongation at break of 700% is formed from the 22.7% elastomer solution as in Example 7.

Example 10

(a) Preparation of NCO-pre-adduct.—About 100 parts of polypropylene glycol (OH number 150) are dewatered after the addition of 0.1 part by volume of 10% hydrochloric acid as in Example 7, dissolved in about 100 parts of dry dioxane and heated for about 5 hours at about 80° C. with about 40.6 parts of an isomeric mixture of toluylene-2,4- and 2,6-diisocyanate (70/30). The NCO-pre-adduct solution then has an NCO content of 3.49%.

(b) Reaction with triamine-N-carboxylic acid.—About 10,000 parts by volume of carbon dioxide are introduced over a gasometer into a solution of about 6.60 parts of $\gamma:\gamma$-diamino-propylmethylamine in about 120 parts of dimethyl sulphoxide. The precipitate which is first formed goes into solution as more carbon dioxide is introduced, the temperature rising to 40 to 41° C. After cooling the triamine-N-carboxylic acid solution to about 25° C., about 100 parts of the above described NCO-pre-adduct solution are added with thorough stirring. $CO_2$ is evolved vigorously and a viscous solution is obtained which has a solids content of 28.5%. The basic reaction product can be precipitated by pouring the solution into water. The product is easily soluble in dilute acetic acid from which it can be reprecipitated with alkali. The reaction product (K-value 42) can be poured from dimethylformamide solution or acetic acid solution to form films, e.g. on textiles. After evaporating off the solvent, elastic films or elastic and abrasion resistant textile coatings are obtained.

The measurement of the elastic properties of threads or films is carried out by means of the elasto-tensographs (Farbenfabriken Bayer) described in Chimia, 16, 93–105 (1962). In this process, the tension at 300% elongation ($M_{300}$) is determined when the thread is stretched for the first time and at a rate of elongation of 400% per minute, and then the tension at 150% elongation is measured in the third release cycle ($M_{150}$) after stretching three times to 300% at a stretching speed of 400% per minute, and the elastic recovery after three stretching-release cycles (300% elongation, 400% per minute elongation speed) is measured 30 seconds after the thread has been released.

Example 11

About 6000 parts of the polyester of Example 9 are heated with 1490 parts of diphenylmethane-4,4'-diisocyanate and 1870 parts of chlorobenzene for 50 minutes to 97–99° C. After cooling the prepolymer has an NCO-content of 2.04 percent.

About 15 parts of solid carbon dioxide are added to a solution of 3.72 parts of γ,γ'-di-(aminopropyl)-methyl amine in 218 parts of dimethylformamide while stirring. Then 100 parts of the above prepolymer solution are added to the suspension of the carbamate. Carbon dioxide escapes from the solution and a homogeneous, viscous solution (380 p./20° C.) is obtained and pigmented by adding of 6.5 parts of a 33 percent titanium dioxide containing paste.

The solution is poured onto glass plates and the foils thus produced are dried at 100° C. to give a colorless film.

| | | |
|---|---|---|
| Tension at 300% | mg./den. | 19 |
| Tension at 150% | mg./den. | 6 |
| Elastic recovery | percent | 70 |

The material is softened above 100° C. and melts at about 180 to 195° C. When dyed with acid dyestuffs, a deep coloration is obtained. At boiling temperature, shrinking of the material occurs.

If the experiment is repeated without adding carbon dioxide to the diamine, an inhomogeneous, jell-like solution is obtained, if only half of the theoretically necessary amount of the prepolymer is added which completely gels when further prepolymer solution is added.

Example 12

A suspension is obtained by adding carbon dioxide to a solution of 2.35 parts of γ,γ'-diaminopropyl-methylamine and 2.40 parts of ethylene diamine (96%) in 427 parts of dimethylformamide. About 200 parts of the prepolymer solution of Example 11 are added to this suspension which results in a homogeneous solution having a viscosity of 400 p./20° C.

After evaporation of the solvent, foils are obtained which can be cut into threads with the following properties:

| | | |
|---|---|---|
| Tear strength | g./den. | 0.61 |
| Elongation at break | percent | 780 |
| Tension at 300% | mg./den. | 72 |
| Tension at 150% | mg./den. | 18 |
| Elastic recovery | percent | 83 |

Example 13

About 20 parts of solid carbon dioxide are added under stirring to a solution of 3.14 parts of hydrazine hydrate and 7.33 parts of 1,6-hexane diamine in 1190 parts of dimethyl acetamide. About 500 parts of the prepolymer of Example 11 are then added within a few minutes to the suspension of the hydrazine-N-carboxylic acid and diamine-N-carboxylic acid with intense stirring. Carbon dioxide escapes and the turbidity disappears giving a homogeneous viscous solution from which after evaporation of the solvent highly elastic foils with good elastic properties are obtained.

Example 14

To a 60° C. solution of 9.45 parts of carbodihydrazide in 1000 parts of dimethylformamide are added with strong stirring simultaneously solid carbon dioxide a solution of 3.80 parts of bis(3-aminopropyl)-methyl amine in 77 parts of dimethylformamide and 500 parts of the prepolymer solution of Example 11 within 4 to 5 minutes. The resulting homogeneous colorless solution is pigmented with titanium dioxide (2.5% calculated on solid content) and has then a viscosity of 91 p./20° C. After adding of one part of 1,6-hexane diisocyanate, the viscosity increases within one hour to 570 p./20° C. About 4.15 parts of the reaction product of equivalent amounts of ethylene imine and the biuret triisocyanate of 1,6-hexane diisocyanate (Houben Weyl, "Methoden der Organischen Chemie," Band XIV/2, page 69) and 8.3 parts of the reaction product of equivalent amounts of N,N-dimethylhydrazine and the above biuret triisocyanate are added to the solution.

The solution is cast onto glass plates and the solvent removed in a drying oven within 60 minutes at 110° C. Highly elastic foils with good mechanical properties are obtained which are up to boiling temperature insoluble in dimethylformamide. The dry spinning process gives highly elastic threads having an elongation at break of more than 500% and an elastic recovery of 85% after three times elongation of 300% and 30 seconds waiting.

Example 15

About 3 parts of solid carbon dioxide are added to a solution of 0.71 part of bis-(3-aminopropyl)-methylamine and 0.35 part of water into 211 parts of dimethylformamide. Then 100 parts of the prepolymer of Example 11 are added with stirring. The solution is first thinly liquid. The viscosity increases after one hour heating to 50° C. to 49 p./20° C. As described in Example 14, elastic foils can be obtained.

It is of course to be understood that the examples are for the purpose of illustration and that the scope of the invention is not to be limited thereby. Further, any of the diisocyanates, isocyanate-pre-adducts, diamine-N-carboxylic acids, diamine-N-sulphinic acids or polar solvents mentioned above may be used in the examples for those specifically used therein.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. The process which comprises reacting in a polar solvent until a substantially linear polyurea or polyhydrazodicarbonamide is formed an organic diisocyanate with the reaction product of a diamine or a hydrazine with carbon dioxide or sulphur dioxide in a polar solvent.

2. The process of claim 1 wherein the diisocyanate is monomeric.

3. The process of claim 1 wherein the organic diamine is ethylene diamine.

4. The process of claim 1 where in the organic diamine is xylylene diamine.

5. The process of claim 1 wherein the organic diisocyanate is 4,4'-diphenylmethane diisocyanate.

6. The process of claim 1 wherein the organic diisocyanate is toluylene diisocyanate.

7. The process of claim 1 wherein the reaction with the organic diisocyanate is conducted at a temperature of from about −20° C. to about 60° C.

8. The process of claim 1 wherein said hydrazine is hydrazine hydrate.

9. The process of claim 1 wherein the organic diisocyanate is the reaction product of a monomeric organic diisocyanate with an organic polyhydroxyl compound.

10. The process of claim 9 wherein the said polyhydroxyl compound is an hydroxyl polyester, a polyalkylene 500 to about 5000 and a melting point less than about 50° C.

11. The process of claim 10 wherein the said polyhydroxyl compound is an hydroxyl polyester, a polyalkylene ether glycol, a polythioether glycol or a polyacetal.

References Cited

UNITED STATES PATENTS

| | | | |
|---|---|---|---|
| 3,077,006 | 2/1963 | Ibrahim | 19—.48 |
| 3,087,912 | 4/1963 | Wagner et al. | 260—67 |
| 3,148,173 | 9/1964 | Axelrood | 260—75 |
| 3,202,636 | 8/1965 | Windemuth et al. | 260—75 |
| 3,236,812 | 2/1966 | McElroy | 260—75 |
| 3,305,533 | 2/1967 | Thoma et al. | 260—75 |

FOREIGN PATENTS 838,217  3/1952  Germany.

OTHER REFERENCES

Michaelis et al.: Berichte 30, pp. 1009–1014 (1897).
Dictionary of Organic Chemical Compounds, vol III, pp. 1633–1635, Oxford Univ. Press (1965).
Stolle et al.: Berichte 37, 4523–4 (1904), Official Gazette 846, pp. 687, 688, 887.

DONALD E. CZAJA, Primary Examiner

H. S. COCKERAM, Assistant Examiner

U.S. Cl. X.R.

260—18, 45.7, 45.8, 45.9, 67, 77.5, 30.2, 30.8, 32.6

UNITED STATES PATENT OFFICE
CERTIFICATE OF CORRECTION

Patent No. 3,499,872  Dated Mar. 10, 1970

Inventor(s) Wilhelm Thoma et al.   PAGE - 1

It is certified that error appears in the above-identified patent and that said Letters Patent are hereby corrected as shown below:

| Column | Line | Error |
|---|---|---|
| 3 | 4 | "means" should read --- meant ---. |
| 3 | 67 | "diamine-γ-" should read --- diamine-N- ---. |
| 7 | 17 | "$MH_2$" should read --- $NH_2$ ---. |
| 14 | 45 | "sinter at about 160°C." should read --- sinter at about 260°C. ---. |
| 15 | 8 | "Tear strength g.den 0.06" should read --- Tear strength g.den 0.60 ---. |
| 18 | Claim 10, line 2 | "is an hydroxyl polyester, a polyalkylene" should be deleted and --- has a molecular weight |

UNITED STATES PATENT OFFICE
CERTIFICATE OF CORRECTION

Patent No. 3,499,872  Dated Mar. 10, 1970

Inventor(s) Wilhelm Thoma et al.  PAGE - 2

It is certified that error appears in the above-identified patent and that said Letters Patent are hereby corrected as shown below:

| Column | Line | Error |
|---|---|---|
| 18 (Continued) | Claim 10, | of from about --- should be inserted. |

SIGNED AND SEALED
SEP 15 1970

(SEAL)
Attest:

Edward M. Fletcher, Jr.
Attesting Officer

WILLIAM E. SCHUYLER, JR.
Commissioner of Patents